(12) United States Patent
McDavid (10) Patent No.: US 10,317,544 B2
(45) Date of Patent: Jun. 11, 2019

(54) EFFICIENT SEISMIC FILE TRANSMISSION (71) Applicant: INOVA, LTD., Grand Cayman (KY)

(72) Inventor: William T. McDavid, Richardson, TX (US)

(73) Assignee: INOVA LTD., Grand Cayman (KY)

( * ) Notice: Subject to any disclaimer, the term of this patent is extended or adjusted under 35 U.S.C. 154(b) by 1078 days.

(21) Appl. No.: 14/306,470

(22) Filed: Jun. 17, 2014

(65) Prior Publication Data

US 2014/0369167 A1 Dec. 18, 2014

Related U.S. Application Data (60) Provisional application No. 61/835,876, filed on Jun. 17, 2013.

(51) Int. Cl.
*G01V 1/22* (2006.01)
*G01V 1/24* (2006.01)

(52) U.S. Cl.
CPC ............... *G01V 1/22* (2013.01); *G01V 1/247* (2013.01)

(58) Field of Classification Search
CPC .................................. G01V 1/22; G01V 1/247
USPC .............................................. 367/59, 60, 66
See application file for complete search history.

(56) References Cited

U.S. PATENT DOCUMENTS

| | | | | |
|---|---|---|---|---|
| 3,860,759 A | * | 1/1975 | Miller ..................... | H04B 1/66 367/14 |
| 4,509,150 A | * | 4/1985 | Davis ..................... | G01V 1/22 367/46 |
| 4,543,632 A | | 9/1985 | Ergas et al. | |
| 5,933,790 A | | 8/1999 | Jeffryes | |
| 6,070,129 A | * | 5/2000 | Grouffal ................. | G01V 1/22 367/77 |
| 6,594,394 B1 | | 7/2003 | Stroemberg et al. | |
| 6,957,147 B2 | | 10/2005 | Baliguet et al. | |

(Continued)

FOREIGN PATENT DOCUMENTS

FR 2747795 A1 10/1997

OTHER PUBLICATIONS

PCT/US2014/042688-International Search Report dated Oct. 28, 2014.

(Continued)

*Primary Examiner* — Ian J Lobo
(74) *Attorney, Agent, or Firm* — Mossman, Kumar & Tyler, PC (57) ABSTRACT

Methods, systems, and devices for conducting a seismic survey. The system includes a seismic sensor supplying a seismic signal; sampling circuitry configured to convert the signal to a sequence of samples, each sample represented by a bit string; a data communication device configured to transmit compressed seismic data; a recording computer configured to receive compressed seismic data; at least one processor with a computer memory accessible thereto, the at least one processor configured to: create a sample block by storing at least a portion of the sequence of samples in memory units in the computer memory, wherein each sample is stored in a corresponding memory unit; and compress data contained in the sample block by encoding all bits of a particular bit number from the memory units of the sample block in sequence to produce compressed seismic data.

15 Claims, 6 Drawing Sheets

(56) References Cited

U.S. PATENT DOCUMENTS

| | | | |
|---|---|---|---|
| 2004/0257913 A1* | 12/2004 | Ray | G01V 1/16 |
| | | | 367/188 |
| 2005/0222775 A1 | 10/2005 | Kisra et al. | |
| 2008/0021658 A1 | 1/2008 | Pavel et al. | |
| 2008/0080312 A1 | 4/2008 | Eperjesi et al. | |
| 2008/0107169 A1 | 5/2008 | Roman | |
| 2008/0186806 A1 | 8/2008 | Elder et al. | |
| 2009/0092002 A1 | 4/2009 | Souders et al. | |
| 2009/0323472 A1 | 12/2009 | Howe | |
| 2010/0278010 A1 | 11/2010 | Gubin et al. | |

OTHER PUBLICATIONS

EP Application No. 14814519.6—EP Search Report dated Dec. 16, 2016.

* cited by examiner

| | Bit 7 | Bit 6 | Bit 5 | Bit 4 | Bit 3 | Bit 2 | Bit 1 | Bit 0 | |
|---|---|---|---|---|---|---|---|---|---|
| Value1 | 0 | 0 | 0 | 0 | 0 | 0 | 1 | - | Byte 0 |
| Value2 | 0 | 0 | 0 | 0 | 0 | 1 | - | - | Byte 1 |
| Value3 | 0 | 0 | 0 | 1 | - | - | - | - | Byte 2 |
| ⋮ | | | | | | | | | |
| ValueN-2 | 0 | 1 | 0 | 0 | 0 | 1 | - | - | Byte N-2 |
| ValueN-1 | 1 | 1 | 0 | 0 | 0 | 0 | 1 | - | Byte N-1 |
| ValueN | 1 | 1 | 0 | 0 | 0 | 0 | 1 | - | |

EFFICIENT SEISMIC FILE TRANSMISSION

CROSS-REFERENCE TO RELATED APPLICATIONS

This application claims priority from U.S. Provisional Application Ser. No. 61/835,876, filed Jun. 17, 2013, the entire disclosure of which is incorporated herein by reference in its entirety.

FIELD OF THE DISCLOSURE

This disclosure generally relates to conducting a seismic survey using a network configured to transmit data.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing the fields (drilling wells) and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 30,000 to 100,000 seismic sensors or more. The number of sensors continues to increase. The seismic sensors (such as, geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. Similarly, seismic surveys may be conducted at sea using seismic arrays modified for such use. The reflections are sensed or detected at the surface by the seismic sensors (hydrophones, geophones, etc.). Data acquisition units deployed in the field proximate the seismic sensors may be configured to receive signals from their associated seismic sensors, at least partially process the received signals, and transmit the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing and recording of the seismic waves is referred to as seismic data acquisition. Two-dimensional and/or three-dimensional maps of the subsurface structures (also known as the "seismic image") may be generated from the recorded seismic data. These maps may then be used to make decisions about drilling locations, reservoir size, pay zone depth, and estimates of the production of hydrocarbons.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay with other field boxes to a central recording system, where all of the data are recorded onto a storage medium, such as a magnetic tape.

Seismic data may be recorded at the field boxes for later retrieval, and in some cases a leading field box is used to communicate with the central recording system over a radio link (radio frequency link or an "RF" link). Seismic data from a survey is voluminous in nature, and typically has a substantial sampling rate. Although the need for efficient transmission is more acute in the case of wireless connections, both wired and wireless seismic systems suffer from limited transmission bandwidth which makes timely transmission of rich data sets problematic.

SUMMARY OF THE DISCLOSURE

In aspects, the present disclosure is related to methods and apparatuses for conducting a seismic survey including transmitting seismic data.

One embodiment according to the present disclosure includes a method for conducting a seismic survey, comprising creating, from a discrete seismic signal comprising a sequence of samples, a sample block by storing at least a portion of the sequence of samples in memory units, wherein each sample is represented by a bit string and stored in a corresponding memory unit; and compressing data contained in the sample block by encoding all bits of a particular bit number from the memory units of the sample block in sequence to produce compressed seismic data.

Another embodiment according to the present disclosure includes receiving a signal from at least one seismic sensor, the signal indicative of reflections of acoustic energy from an earth surface; converting the signal to a sequence of samples, wherein each sample is represented by a bit string; creating a sample block by storing at least a portion of the sequence of samples in memory units, wherein each sample is stored in a corresponding memory unit; compressing data contained in the sample block by encoding all bits of a particular bit number from the memory units of the sample block in sequence to produce compressed seismic data; and transmitting the compressed seismic data. The compressed seismic data may be transmitted to a recording computer. Converting the signal to the sequence of samples may include at least one of: i) converting the signal, wherein the signal is an analog signal, to a discrete signal, and sampling the discrete signal, and ii) sampling the signal, wherein the signal is a discrete signal.

Another embodiment according to the present disclosure includes receiving an analog signal at an analog-to-digital converter from at least one seismic sensor in electrical communication with the analog-to-digital converter, the signal indicative of reflections of acoustic energy from an earth surface; converting the analog signal to a discrete signal comprising a sequence of samples from the analog signal, wherein each sample is represented by a bit string; creating a sample block by storing at least a portion of the sequence of samples in memory units, wherein each sample is stored in a corresponding memory unit; compressing data contained in the sample block by encoding all bits of a particular bit number from the memory units of the sample block in sequence to produce compressed seismic data; and transmitting the compressed seismic data. The compressed seismic data may be transmitted to a recording computer.

Encoding may be carried out by encoding with a Run Length Encoding algorithm. Each memory unit may include a high order bit, and the method may include compressing data contained in the sample block by: incrementally encoding a value from the high order bit of each memory unit in the sample block; and repeating the incremental encoding step for each bit number of the memory units in succession until a selected bit number is reached.

The method may include decompressing the compressed seismic data; and imaging an area below the earth surface in dependence upon the decompressed seismic data.

The order of the memory units in the sample block may correspond to the order of the samples in the sequence. Each memory unit may have an identical length.

Software aspects of the invention may include at least one non-transitory computer program product having machine readable instructions thereon, that when executed by at least one processor carry out methods described herein.

Another embodiment according to the present disclosure includes a non-transitory computer program product comprising a computer readable medium having disposed thereon computer program instructions for conducting a seismic survey, comprising: creating, from a discrete seismic signal comprising a sequence of samples, a sample block by storing at least a portion of the sequence of samples in memory units, wherein each sample is represented by a bit string and stored in a corresponding memory unit; and compressing data contained in the sample block by encoding all bits of a particular bit number from the memory units of the sample block in sequence to produce compressed seismic data.

Another embodiment according to the present disclosure includes a system for conducting a seismic survey, comprising: at least one seismic sensor configured to supply an analog signal responsive to reflections of acoustic energy from an earth surface; an analog-to-digital converter in electrical communication with the at least one seismic sensor and configured to convert the analog signal to a discrete signal comprising a sequence of samples from the analog signal, wherein each sample is represented by a bit string; and at least one processor and a computer memory accessible to the at least one processor, the at least one processor configured to: create a sample block by storing at least a portion of the sequence of samples in memory units in the computer memory, wherein each sample is stored in a corresponding memory unit; and compress data contained in the sample block by encoding all bits of a particular bit number from the memory units of the sample block in sequence to produce compressed seismic data; a data communication device configured to transmit the compressed seismic data; and a recording computer configured to receive the compressed seismic data. The at least one seismic sensor may include a geophone.

Another embodiment according to the present disclosure includes a system for conducting a seismic survey, comprising: at least one seismic sensor configured to supply a signal responsive to reflections of acoustic energy from an earth surface; sampling circuitry in electrical communication with the at least one seismic sensor and configured to convert the signal to a sequence of samples, wherein each sample is represented by a bit string; and at least one processor and a computer memory accessible to the at least one processor, the at least one processor configured to: create a sample block by storing at least a portion of the sequence of samples in memory units in the computer memory, wherein each sample is stored in a corresponding memory unit; and compress data contained in the sample block by encoding all bits of a particular bit number from the memory units of the sample block in sequence to produce compressed seismic data; a data communication device configured to transmit the compressed seismic data; and a recording computer configured to receive the compressed seismic data. The sampling circuitry may include at least one of: i) analog-to-digital sampling circuitry, and ii) digital sampling circuitry.

Examples of some features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for conducting seismic survey activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a seismic survey follows below.

Figure 1:
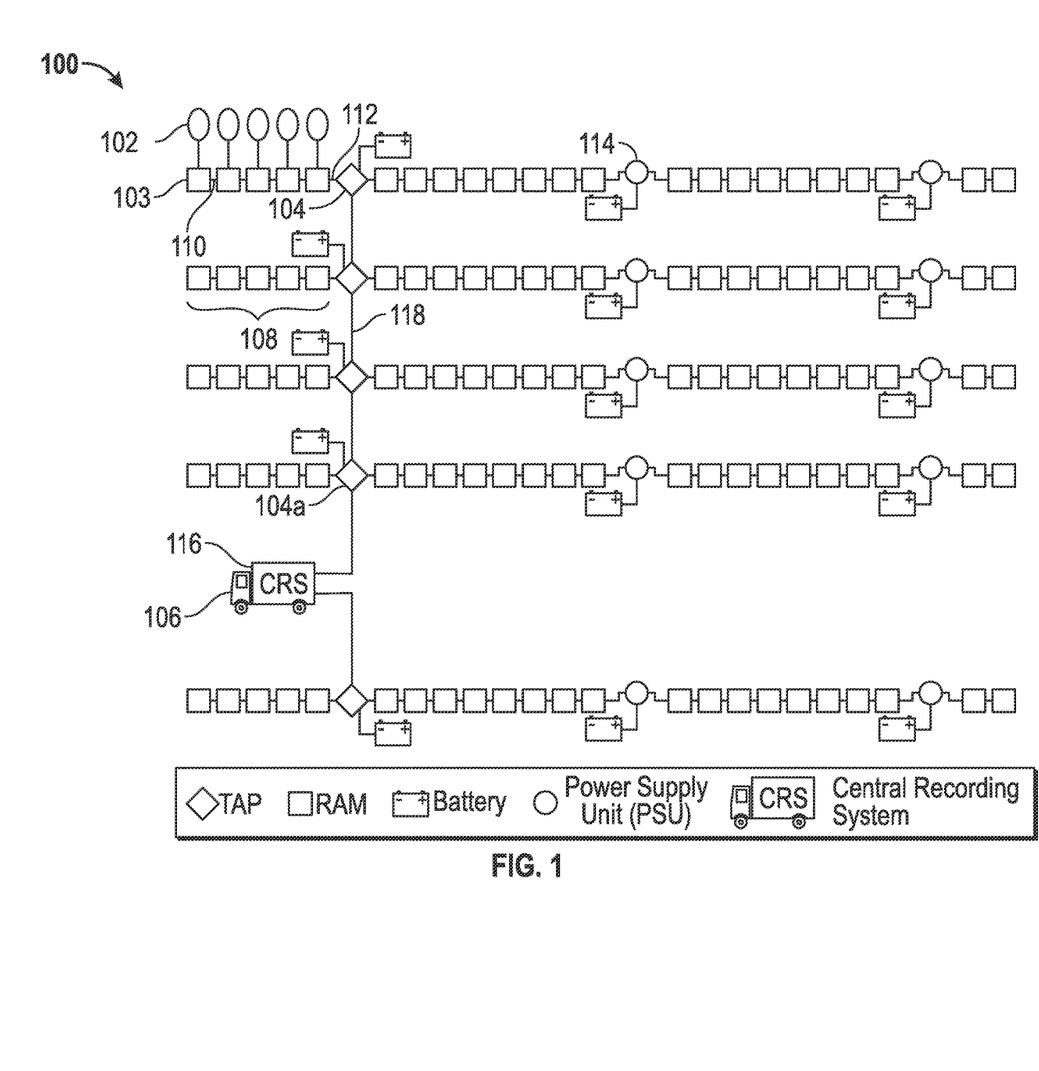
FIG. 1 shows a schematic of a seismic survey system according to one embodiment of the present disclosure.

FIG. 1 depicts an embodiment of a cable seismic data acquisition system 100. The cable seismic data acquisition system 100 includes a seismic source (not shown) providing acoustic energy waves into the earth surface and a plurality of interconnected seismic devices distributed across an earth surface at intervals. The system includes an array (string) of spaced-apart seismic sensor units 102. The seismic sensor units are coupled to at least one seismic device through cabling. The seismic sensor units provide seismic signals to the plurality of seismic devices in response to detected reflections from the acoustic energy waves. The system also includes a central recording system receiving telemetry data from one or more of the plurality of seismic devices through the data communication device.

Seismic sensor units 102 may include, but are not limited to, one more of: geophones and hydrophones. Each sensor 102 is typically coupled via cabling to a seismic data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Cable 112 may include, but is not limited to, one or more of: (i) copper conductors and (ii) fiber optic cable. Several FTUs 104 and associated lines 112 are usually coupled together by cabling, such as shown by the baseline cable 118. Baseline cable 118 includes fiber optic cable.

A RAM 103 may be configured to record analog seismic signals that are generated by seismic sensors 102, including, but not limited to, geophones and hydrophones. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signals from one or more seismic sensors 102. The digitized information transmitted by the RAM 103 may be augmented with status information. The FTU 104 may be configured to transmit the digitized information to a central recording system (CRS) 106. In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114.

The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device or processing device. The CRS 106 may be positioned in a recording truck or other comparable location.

In the field, the sensors 102 may be spaced between 10-50 meters. Each of the FTUs 104 typically performs some signal processing and then stores the processed signals as seismic information. The FTUs 104 may be coupled, either in parallel or in series, with one of the units 104a serving as an interface between the CRS 106 and one or more FTUs 104. This system may use wired communication media, e.g., RS-232, Ethernet, USB, etc. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12@55 meters) and connected to receiver cable lines. The receiver cable lines may also be connected to FTUs 104. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2:
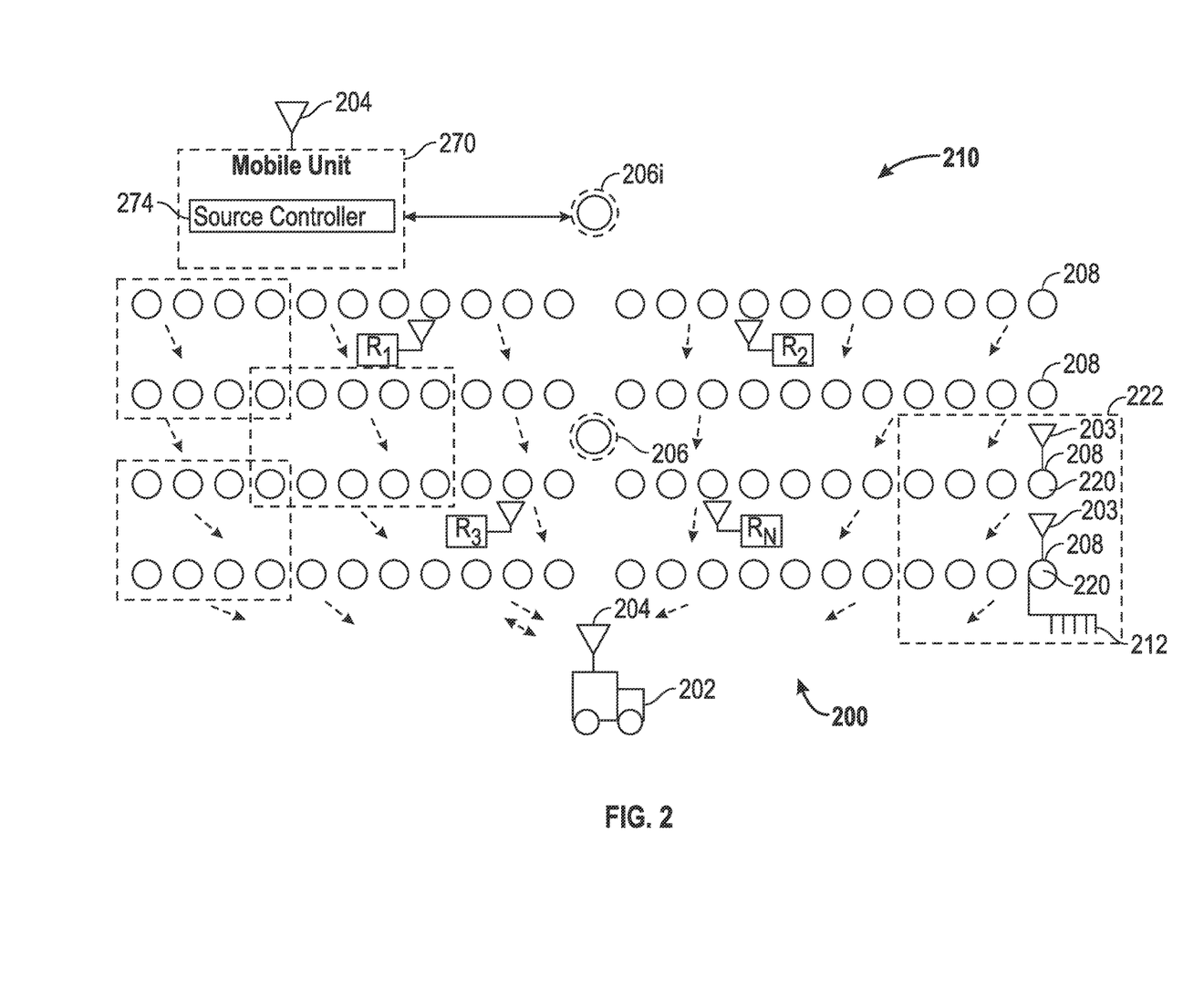
FIG. 2 shows a schematic of a wireless seismic survey system according to one embodiment of the present disclosure.

Referring to FIG. 2, a representation of a wireless seismic data acquisition system 200 is shown according to one embodiment of the present disclosure. The system 200 includes a central controller or control unit (CU) 202 in data communication with each of a number of wireless field station units (FSU) or sensor stations 208 forming an array (spread) 210 for seismic data acquisition. The wireless communication between the central controller 202 with the FSUs may be direct bi-directional wireless communication or via an intermediate unit such as a repeater unit (RU)(not shown). Each sensor station 208 includes one or more sensors 212 for sensing seismic energy. The sensors 212 may be any suitable seismic sensors, including geophones, and one or more component accelerometers.

Direct communication as used herein refers to individualized data flow as depicted in FIG. 2 by dashed arrows. A wireless communication system can be a VHF, UHF, WiFi, or other wireless radio communication system. The data flow can be bi-directional to allow one or more of: transmission of command and control instructions from the central controller 202 to each wireless sensor station 208; and transmission of status signals, operating conditions and/or selected pre-processed seismic information from each wireless sensor station 208 to the central controller 202. The communication might be in the form of radio signals transmitted from and received by the sensor stations 208 and central controller 202 via suitable antennas 203 and 204 respectively.

In an active mode, the system 200 uses one or more seismic energy sources 206 to generate seismic energy of known characteristics, such as magnitude, frequency etc., at known locations in the seismic spread to impart seismic energy into the subterranean formation. A representative seismic energy source is designated with numeral 206i. Activation (or more commonly, "shooting" or "firing") of the source 206i may be initiated locally by a mobile unit 270. Mobile unit 270 may include a source controller 274.

In other embodiments, sensor stations 208 may be autonomous once deployed in the field. Some sensor stations may include GPS circuitry for determining position or to acquire timing information. Such units may contain sufficient memory (e.g., 16 GB or more) for extended recording. In some cases, continuous recording is employed without the need for synchronization with shooting events.

In some embodiments, after shooting is completed, sensor stations may be harvested and taken to a central location for data retrieval. Data retrieval may also be conducted in the field by approaching the sensors and retrieving the data. In either case, data retrieval may be performed via wired or wireless connection, or combinations of the same. In some cases sample data may be extracted from a sensor station, such as, for example, to test the data quality to ensure device performance or positioning or to preview the characteristics of the measured area.

Compression of seismic data is desirable due to its voluminous nature and due to the characteristics of the data. Acoustic data for a dynamic shot may include considerable amounts of low amplitude random noise surrounding a high amplitude section corresponding to the shot. However, the systems of FIGS. 1 & 2 may be quite power sensitive. As a result, only modest computing resources may be available at the FTU for compressing data. Compression may be performed in the FTU, in an intermediate seismic device in preparation for retrieval, in an intermediate device during retrieval or afterwards, or at the central recording station.

Figure 3:
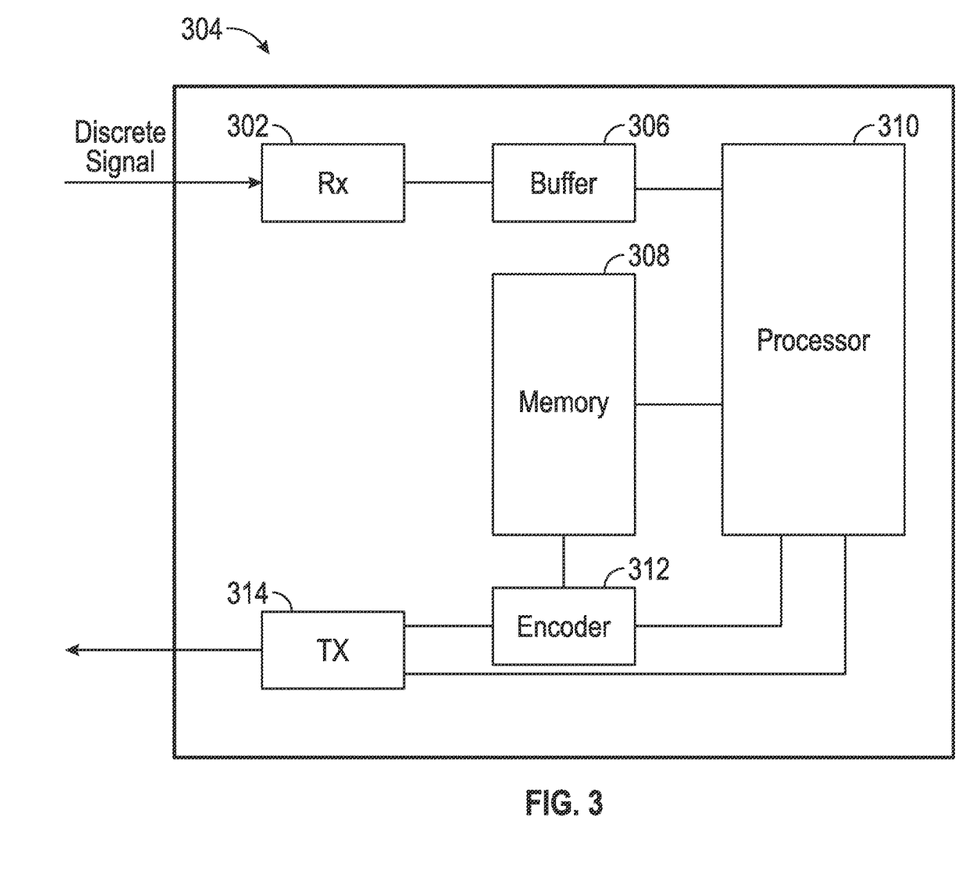
FIG. 3 shows a diagram for a fiber TAP unit according to one embodiment of the present disclosure.

FIG. 3 shows a diagram for FTU 304. FTU 304 includes a receiver 302 and a transceiver 314, which may be combined in particular implementations. The design of receiver 302 and transceiver 314 may be specific to the communications protocols employed by FTU 304. FTU 304 also includes buffer 306, processor 310, and memory 308. FTU 304 also includes an additional processor (encoder 312). Encoder 312 is a specially configured processor for rapid encoding operations. Although only one buffer and receiver are shown, other embodiments may use multiple receivers and/or buffers depending on bandwidth and network configuration.

In operation, the receiver 302 receives discrete seismic signal 301 which is fed to buffer 306. Discrete seismic signal is comprised of a sequence of values derived from sampling an analog seismic signal from a seismic sensor (for example, at RAM 103) or received from a natively digital sensor. These values may be referred to as samples. The sequence of samples originally comprising discrete signal 301 may also be referred to herein as discrete signal 301 for convenience. The signal may be recovered as a bitstream at FTU 304. In some implementations, discrete signal 301 may be combined with other commands or information, or may be encrypted, compressed, and so on. Therefore, additional processing may be required by processor 310 or additional components to recover discrete signal 301. The discrere signal 301 is converted to a sequence of samples. Each sample of the signal may be represented as a bit string. Processor 310 creates a sample block by storing each sample (e.g., bit string) sequentially in a corresponding memory unit of the computer memory 308. Sample block may be implemented as an array. The memory unit may be defined as the natural unit of data used by a particular system or processor design. The memory unit may be a fixed-sized group of bits that are handled as a unit by the instruction set and/or hardware of the processor. The particular memory unit is chosen according to system specifications (e.g., a 32-bit memory unit). Depending on resolution, some of the lower order bits of the memory unit may remain empty. Because the bit resolution is dependent upon the noise floor of the sensor, the lowest practical bandwidth may vary from sample to sample. That is, noisy conditions may render the lowest value (highest resolution) bits impractical.

Encoder 312 compresses data contained in the sample block by retrieving and encoding the seismic data contained in the sample block sequentially. Encoder 312 and processor 310 may cooperate to encode the seismic data. In other embodiments, processor 310 may perform all encoding and encoder 312 may be omitted. The encoded data may be stored in memory 308 or sent to transmitter 314 for transmission to other seismic devices, CRS 106, or central controller 202. In some embodiments, compression as described herein is carried out in RAM 103, auxillary device 116, or other seismic device.

Figure 4A:
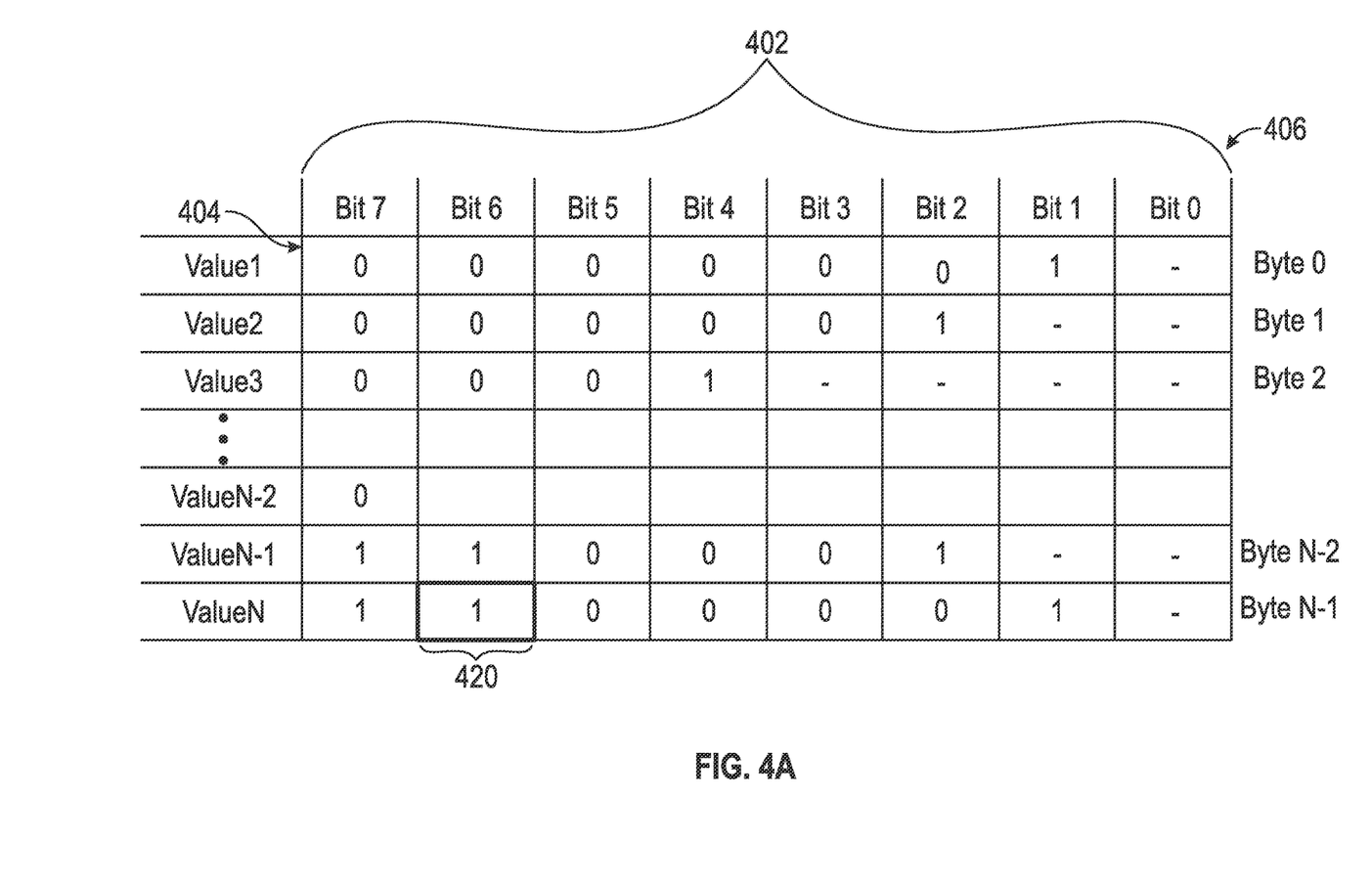
FIGS. 4A & 4B show data flow diagrams illustrating compression techniques according to embodiments of the present disclosure.

FIG. 4A shows a data flow diagram illustrating compression techniques according to embodiments of the present disclosure. For convenience, FIG. 4A shows an 8-bit (byte) memory unit 402, although 16-bit, 32-bit or any other memory unit size compatible with the specific components of the system may be used as desired. The bits 420 of the memory unit are numbered (0-7) for convenience. In each memory unit, "bit 7" is the high order bit and "bit 0" is the low order bit. A sample block 406 of suitable size for encoding and transmission is chosen. The sample block 406 of FIG. 4 has N samples. The number of samples may be configured to the specific application. In some applications, N may be 10,000; 30,000; 60,000; or more. Sample N of the signal portion (and therefore of sample block 406) may be represented as "110001" in binary notation. Depending on resolution, the lowest allowed bit numbers may not be used in a particular sample. Bit 7 represents the sign of each sample. Bit 6 represents the most significant bit ('MSB') of each sample. Bit 0 represents the lowest possible least significant bit ('LSB') of the sample.

A processor implementing a compression algorithm processes data orthogonally to the manner in which it is stored. The processor encodes the sequence of bits making up a particular bit number for all the samples of the sample block. For example, the processor first encodes a bit sequence comprising bit 7 (the "sign bit") of all N samples. Next, the processor encodes a bit sequence comprising the MSB of the magnitude portion of all N samples, followed by a bit sequence comprising the next most significant (e.g., fifth) bit of all N samples, and so on until a selected bit number is reached.

Figure 4B:
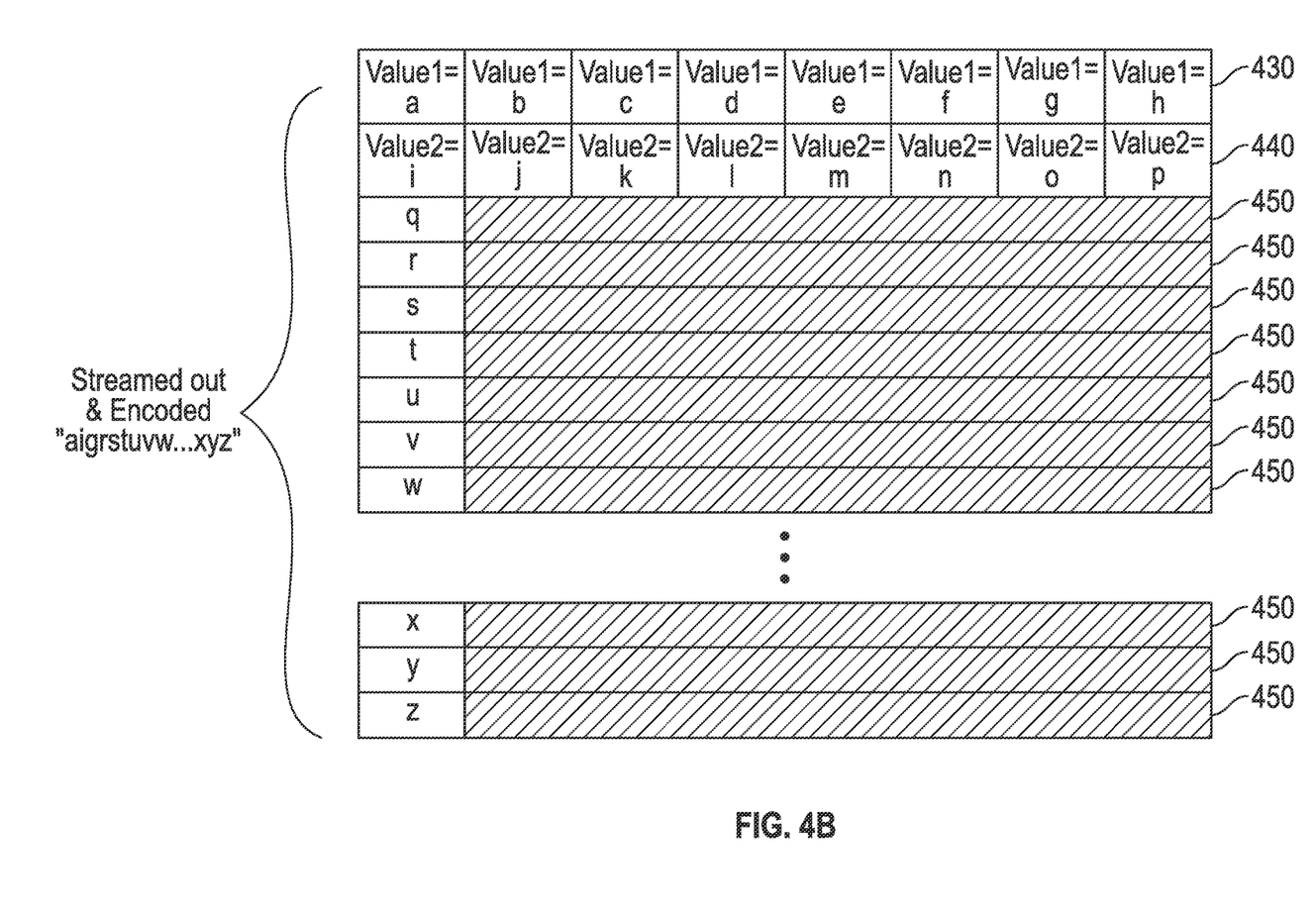

FIG. 4B shows a data flow diagram illustrating compression techniques according to embodiments of the present disclosure. Note that sample 1 is the bit string "abcdefgh", wherein each letter represents a binary value (0 or 1). Sample 1 is stored in memory unit 0 (430) of the sample block. Sample 2 is the bit string "ijklmnop". Sample 2 is stored in memory unit 1 (440). The block is subsequently filled with the remaining samples available by filling samples into the remaining memory units (450). During compression of the sample block, the processor encodes the sequence "aiqrstuvw . . . xyz", which are the values present in the high order bit of the samples of the sample block, followed by a sequence beginning with "bj . . . ".

In some implementations, all bits may be processed, while in others only a selected number of bits of each sample are streamed out. Less significant bits may be trimmed based on gain and sample rate. The bit-significance limit number is selected to insure that the quantization noise of the decompressed data is below the noise floor for the gain and sample interval in use to acquire the data. A lookup table may be used by a processor to provide the significance number according to the seven gain options and the five sample interval options. The unneeded rows of numerical resolution may be discarded.

In one example seismic survey system disclosed herein, samples may be stored in a 32-bit memory unit. As the signal is retrieved from the digitizing channel, data may be in signed integer format. Any over-scale events marked by the LSB may be resolved by zeroing that LSB. Residual offset may be removed (still with 32-bit integer result) prior to compression to improve the compression ratio.

The processor may reformat samples from two's complement format to sign and magnitude format. This is done in blocks of a size suitable for final central storage in SEG-Y format (a format for storing geophysical data) if the deliverable is continuous data. For example, such a block may contain 60,000 samples per block. If the data is shot-oriented, the block size may be the shot record.

In some embodiments, data to be encoded is streamed to the processor implementing the compression algorithm. The sign bit of all N samples (e.g., N=60,000) is streamed first, followed by the MSB of the magnitude portion of all N samples. Bit streaming continues down the sample significance until a selected number of bits (e.g., 20-28 bits, dependent on gain and sample rate) of each sample are streamed out. After processing, the encoded data blocks may be prepended with un-encoded headers and queued in memory for streaming to the bandwidth-limited transfers.

Processing the streamed bits may entail reformulating the bitstream into bytes and compressing the bit stream using a Run Length Encoding (RLE) algorithm. Run Length Encoding is a well-known and easily implemented compression technique used for a variety of data types. In general, run-length encoding replaces a sequence (i.e., run) of consecutive bits having the same value with a run indication including a designation of the value and the length of the sequence. Numerous variations of run-length encoding are publicly available. See generally U.S. Pat. No. 6,304,928 to Mairs et al.; U.S. Pat. No. 5,883,633 to Gill et al; and U.S. Pat. No. 6,233,017 to Chaddha.

Referring again to FIG. 4A, note that bit 7 has a zero value for samples 1 . . . N-2. The RLE implementation may be used in cases where the sequences comprising the higher-order bits will have long runs of all zero. As the order of the bits decreases, more instances of random patterns occur, so the algorithm may revert to literal copy when appropriate to avoid expansion due to attempting to encode data bytes having a run length of unity.

An encoder according to the present disclosure may use one or more of a variety of different lossless compression techniques. Generally, other lossless compression techniques (e.g., Huffman encoding, arithmetic encoding, etc.) may be used in addition to RLE, with corresponding decompression techniques at the destination device.

Figure 5:
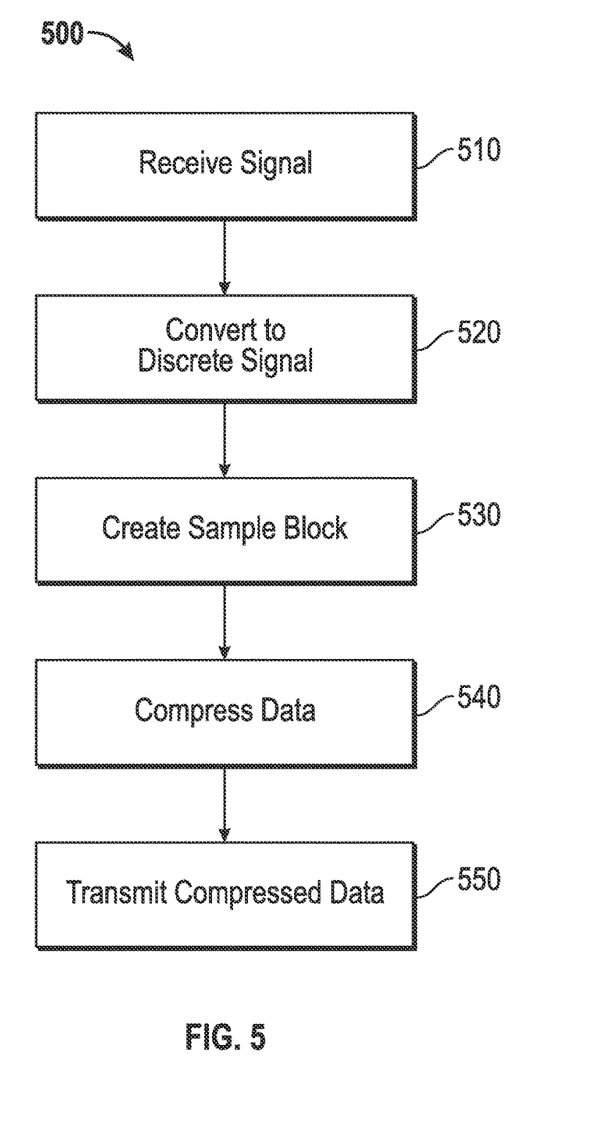
FIG. 5 shows a flow chart for a method for one embodiment according to the present disclosure.

FIG. 5 shows a flow chart 500 for conducting a seismic survey according to one embodiment of the present disclosure. Step 510 may include receiving a signal from at least one seismic sensor. The signal may be indicative of reflections of acoustic energy from an earth surface, and may be received directly or indirectly. Step 520 may include converting the signal to a sequence of samples, wherein each sample is represented by a bit string. Converting the signal to a sequence of samples may be carried out using sampling circuitry. The sampling circuitry may include analog-to-digital sampling circuitry and/or digital sampling circuitry. Digital sampling circuitry may be configured to sample a discrete signal. Analog-to-digital sampling circuitry may include an analog-to-digital converter configured to convert an analog signal from the seismic sensor to a discrete signal in addition to circuitry for sampling a discrete signal.

For example, step 510 may be carried out by receiving an analog signal at an analog-to-digital converter ('ADC') from at least one seismic sensor in electrical communication with the analog-to-digital converter. In some embodiments, the sensor may be part of a sensor unit commonly referred to as a "digital sensor." Such a sensor unit may be self-contained in that it delivers a discrete signal. The sensor unit may have ADC circuitry integrated with the analog sensor in the sensor unit, or the sensor may be natively digital, as in some microelectromechanical accelerometers and the like. Thus, upon the sensor sensing an analog value (e.g., acceleration) the integrated circuitry may perform step 510 and/or 520 before delivering a digital bit stream as the output of the circuit, or these steps may be performed using circuitry in the FTU 304 or in other locations in the system. In other embodiments, the native digital signal from the sensor may be sampled. The system may include any combination of measurement sensor (e.g., a transducer) and supporting circuitry that converts physical motion to discrete (e.g., digitized) electrical data. This can apply to both analog sensors as well as natively digital sensors.

Step 530 may include creating a sample block by storing at least a portion of the sequence of samples in memory units, with each sample stored in a corresponding memory unit. Step 540 may include compressing data contained in the sample block by encoding all bits of a particular bit number from the memory units of the sample block in sequence to produce compressed seismic data. Step 550 may include transmitting the compressed seismic data. For example, the compressed seismic data may be transmitted to a recording computer, either directly or indirectly.

The term non-transitory computer-readable media as used herein comprises all computer-readable media with the sole exception of a transitory, propagating signal. The non-transitory computer-readable medium may include at least one of: (i) a ROM, (ii) an EPROM, (iii) an EEPROM, (iv) a flash memory, and (v) an optical disk.

Portions of the present disclosure pertaining to "software aspects" of the disclosure are used herein. These aspects may include computer program instructions or other logic embodied on or in a non-transitory computer-readable medium product that, when executed by at least one processor, causes the at least one processor to perform a method as described herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The term "seismic devices" means any device that is used in a seismic spread, including, but not limited to sensors, sensor stations, receivers, transmitters, power supplies, control units, etc. The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

While the foregoing disclosure is directed to the one mode embodiments of the disclosure, various modifications will be apparent to those skilled in the art. It is intended that all variations be embraced by the foregoing disclosure.

What is claimed is:

1. A system for conducting a seismic survey, comprising:
at least one seismic sensor configured to supply a signal responsive to reflections of acoustic energy from an earth surface;
sampling circuitry in electrical communication with the at least one seismic sensor and configured to convert the signal to a sequence of samples, wherein each sample is represented by a bit string; and
at least one processor and a computer memory accessible to the at least one processor, the at least one processor configured to:
create a sample block by storing at least a portion of the plurality of samples in memory units in the computer memory, wherein each sample is stored in a corresponding memory unit;

assign a number to the at least one bit of each sample;
form at least one column that includes bits having a same assigned number; and
compress data contained in the sample block by encoding the at least one column to produce compressed seismic data;
a data communication device configured to transmit the compressed seismic data; and
a recording computer configured to receive the compressed seismic data.

2. The system of claim 1, wherein the sampling circuitry comprises at least one of: i) analog-to-digital sampling circuitry, and ii) digital sampling circuitry.

3. The system of claim 1, where in the at least one seismic sensor includes a geophone.

4. The system of claim 1, wherein encoding comprises encoding using a Run Length Encoding algorithm.

5. The system of claim 1, wherein each memory unit includes a high order bit, and the at least one processor is further configured to compress data contained in the sample block by:
incrementally encoding a value from the high order bit of each memory unit in the sample block; and
repeating the incremental encoding step for each bit number of the memory units in succession until a selected bit number is reached.

6. The method of claim 1, wherein the order of the memory units in the sample block corresponds to the order of the samples in the sequence.

7. The system of claim 1, wherein each memory unit has an identical length.

8. A method of conducting a seismic survey, comprising:
receiving a signal from at least one seismic sensor, the signal indicative of reflections of acoustic energy from an earth surface;
converting the signal to a plurality of samples, wherein each sample is represented by a bit string;
creating a sample block by storing at least a portion of the plurality of samples in memory units, wherein each sample is stored in a corresponding memory unit;
assigning a different number to each bit making up the bit string of each sample;
forming a plurality of columns, wherein each column includes bits having a same assigned number;
compressing data contained in the sample block by sequentially encoding each column to produce compressed seismic data; and
transmitting the compressed seismic data.

9. The method of claim 8, wherein converting the signal to the sequence of samples comprises at least one of: i) converting the signal, wherein the signal is an analog signal, to a discrete signal, and sampling the discrete signal, and ii) sampling the signal, wherein the signal is a discrete signal.

10. The method of claim 8, wherein encoding comprises encoding with a Run Length Encoding algorithm.

11. The method of claim 8, wherein each memory unit includes a high order bit, and the method further comprises compressing data contained in the sample block by:
incrementally encoding a value from the high order bit of each memory unit in the sample block; and
repeating the incremental encoding step for each bit number of the memory units in succession until a selected bit number is reached.

12. The method of claim 8, further comprising:
decompressing the compressed seismic data; and
imaging an area below the earth surface in dependence upon the decompressed seismic data.

13. The method of claim 8, wherein the order of the memory units in the sample block corresponds to the order of the samples in the sequence.

14. The method of claim 8, wherein each memory unit has an identical length.

15. A method of conducting a seismic survey, comprising:
receiving a signal from at least one seismic sensor, the signal indicative of reflections of acoustic energy from an earth surface;
converting the signal to a plurality of samples, wherein each sample is represented by a bit string;
creating a sample block by storing at least a portion of the plurality of samples in memory units, wherein each sample is stored in a corresponding memory unit;
assigning a different number to each bit making up the bit string of each sample;
forming a plurality of columns, wherein each column includes bits having a same assigned number;
compressing data contained in the sample block by sequentially encoding each column to produce compressed seismic data; and
transmitting the compressed seismic data.

* * * * *